(12) United States Patent
Song

(10) Patent No.: US 6,169,727 B1
(45) Date of Patent: Jan. 2, 2001

(54) DEVICE AND METHOD OF NOTIFYING AND CONTROLLING CONGESTION IN ASYNCHRONOUS TRANSFER MODE NETWORK

(75) Inventor: Doug-Young Song, Seongnam (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 08/922,305

(22) Filed: Sep. 2, 1997

(30) Foreign Application Priority Data

Sep. 2, 1996 (KR) .................................................. 96-37932

(51) Int. Cl.[7] .................................................. H04L 12/26
(52) U.S. Cl. ............................................ 370/235; 370/236
(58) Field of Search .................................. 370/229, 230, 370/231, 235, 236, 395, 412, 468

(56) References Cited

U.S. PATENT DOCUMENTS

| | | |
|---|---|---|
| 5,048,013 | 9/1991 | Eng et al. . |
| 5,062,106 | 10/1991 | Yamazaki et al. . |
| 5,067,127 | 11/1991 | Ochiai . |
| 5,090,011 | 2/1992 | Fukuta et al. . |
| 5,167,033 | 11/1992 | Bryant et al. . |
| 5,280,483 | 1/1994 | Kamoi et al. . |
| 5,400,329 | 3/1995 | Tokura et al. . |
| 5,463,620 | 10/1995 | Sriram . |
| 5,570,348 | * 10/1996 | Holden .................. 370/236 |
| 5,574,720 | 11/1996 | Lee . |
| 5,629,928 | * 5/1997 | Calvignac et al. ........ 370/237 |
| 5,646,943 | 7/1997 | Elwalid . |
| 5,726,977 | * 3/1998 | Lee .................. 370/235 |
| 5,726,987 | * 3/1998 | Uriu et al. ............. 370/395 |
| 5,897,007 | * 11/1999 | Molin et al. ........... 370/236 |
| 5,936,958 | * 8/1999 | Soumiya et al. ......... 370/395 |

* cited by examiner

*Primary Examiner*—Melvin Marcelo
(74) *Attorney, Agent, or Firm*—Robert E. Bushnell, Esq.

(57) ABSTRACT

A congestion notifying device, which is provided in communication circuits subjected to congestion in an asynchronous transfer mode (ATM) network, comprises: a congestion indication signal generator for generating a congestion indication signal when congestion occurs within any one of the communication devices; an explicit forward congestion indication (EFCI) bit set position detector for generating set position information to detect a prescribed bit set position of each incoming ATM cell in response to a cell synchronization signal and a cell clock signal; and an explicit forward congestion indication (EFCI) bit set control unit for responding to the congestion indication signal and the set position information to set, on the prescribed bit set position of each incoming ATM cell, an explicit forward congestion indication bit for notifying of occurrence of the congestion in any one of the communication devices.

30 Claims, 6 Drawing Sheets

DEVICE AND METHOD OF NOTIFYING AND CONTROLLING CONGESTION IN ASYNCHRONOUS TRANSFER MODE NETWORK

CLAIM FOR PRIORITY

This application makes reference to, incorporates the same herein, and claims all benefits accruing under 35 U.S.C. §119 from an application for *DEVICE FOR NOTIFYING AND CONTROLLING CONGESTION IN THE ASYNCHRONOUS TRANSFER MODE NETWORK AND METHOD THEREFOR* earlier filed in the Korean Industrial Property Office on the Sep. 2, 1996, and there duly assigned Ser. No. 37932/1996, a copy of which application is annexed hereto.

BACKGROUND OF THE INVENTION

1. Technical Field

The present invention relates to an asynchronous transfer mode (ATM) network, and more particularly, relates to a device for notifying of congestion such as overflows in communication devices of the ATM network and a method for controlling such a congestion.

2. Related Art

Generally, ATM is a specific packet-oriented transfer mode using an asynchronous time division multiplexing technique where both line switching and packet switching are unified and many pieces of information, such as voice, data, and pictures, are organized in fixed-sized blocks, called cells. ATM can operate as both a packet exchange system and a circuit exchange system in one transmission mode for efficiently embodying both high speed and wide band communication networks. ATM is a target transfer mode solution for implementing a broadband integrated services digital network (B-ISDN) because it offers effective information channel management based upon virtual path and virtual channel identifiers ("VPI" and "VCI") placed in a header of each cell in order to facilitate the use of a multiplexing, demultiplexing and exchange of digital information, and in order to decrease the costs of broad-band communication network facilities due to flexibility in bandwidth distribution.

An important consideration in ATM network operation is traffic control, i.e., the process of controlling the amount of information entering and traversing the network. Traffic control techniques are generally described, for example, in U.S. Pat. No. 5,253,247 for *Traffic Control Method And Traffic Control System For Controlling Cell Traffic In An Asynchronous Transfer Mode Communication Network* issued to Hirose et al., U.S. Pat. No. 5,280,483 for *Traffic Control System For Asynchronous Transfer Mode Exchange* issued to Kamoi et al., and U.S. Pat. No. 5,519,689 for *Traffic Control Apparatus And Method Of User-Network Interface Of Asynchronous Transfer Mode* recently issued to Kim and assigned to the same assignee of the present invention. Generally, the rate of data transmission between two points is regulated for flow control, or alternatively, traffic avoidance schemes are used to minimize conditions under which a sending node is unable to forward packets because no buffers are available in a receiving node along the transmission path.

One popular traffic control technique is congestion control which is to maintain the amount of information (e.g. the number of cells) within the ATM network below a level at which performance (e.g. delay, cell loss, etc.) becomes unacceptable. The objective of congestion control is to limit the fullness of buffers at nodes in the ATM network so as to avoid cell loss or delay. Contemporary congestion control systems for ATM networks are disclosed, for example, in U.S. Pat. No. 5,048,013 for *Transmission Congestion Control Method And Apparatus* issued to Eng et al, U.S. Pat. No. 5,062,106 for *ATM Exchange System* issued to Yamazaki et al., U.S. Pat. No. 5,067,127 for *Congestion Avoidance Control System* issued to Ochiai, U.S. Pat. No. 5,090,011 for *Packet Congestion Control Method And Packet Switching Equipment* issued to Fukuta et al., U.S. Pat. No. 5,167,033 for *Congestion Control In Computer Networks* issued to Bryant et al., U.S. Pat. No. 5,400,329 for *Packet Network And Method For Congestion Avoidance In Packet Networks* issued to Tokura et al., U.S. Pat. No. 5,463,620 for *Bandwidth Allocation Transmission Scheduling, And Congestion Avoidance In Broadband Asynchronous Transfer Mode Networks* issued to Sriram U.S. Pat. No. 5,574,720 for *Traffic Output Suppression Apparatus And Method For Preventing Congestion In Asynchronous Transfer Mode Network* issued to Lee, and U.S. Pat. No. 5,646,943 for *Method For Integrated Congestion Control In Networks* issued to Elwalid.

Generally, ATM networks use an explicit forward congestion notification (EFCN) method for controlling congestion in accordance with a recommendation from the Telecommunication Standardization Sector of International Telecommunication Union (ITU-T). A second bit of an ATM cell header payload type (PT) field is used for the explicit forward congestion indication (EFCI). In the congested ATM switch EFCI bits are set to ATM cells which are then output in a forward direction from a sending node to a receiving node. ATM cells containing EFCI bits inform all the ATM switches of a congestion state, while reaching the final destination, i.e., the receiving node. The receiving node returns the congestion notifying cell in a reverse direction so that all of the ATM switches and the sending and receiving nodes can be informed of the congestion state. Typically, the congestion notifying function is performed only when the congestion, such as buffer overflow, arises in interfaces of a switch unit. One problem that I have observed, however, is that the switch unit and control/maintenance unit must be provided with additional hardware in order to transfer such buffer overflow information through separate information channels. Another problem nota is that the processing time is delayed by information collection time, and as a result, the congestion control speed is slow. In addition, all interfaces of an ATM switch unit must administer and control the congestion states for every established connection. Since the number of connections available in the ATM network are $2^{24}$ at the maximum in the case of a user network interface (UNI), congestion control and administration for every connection is practically impossible.

SUMMARY OF THE INVENTION

Accordingly, it is therefore an object of the present invention to provide a congestion notification device in an ATM network.

It is also an object to provide a congestion notification device installed in respective communication devices of an ATM network for notifying of congestion when overflow occurs in the communication devices of the ATM network.

It is another object to provide a method for preventing congestion notification delay resulting from congestion control within an ATM network.

It is still another object to provide a method for performing a congestion control function in advance before congestion occurs in an ATM network.

It is a further object to provide a device and a method for performing congestion control at every connection in an ATM network.

It is a further object to provide a simple circuit device for notifying of congestion resulting from buffer overflow and a method for rapidly and efficiently controlling the congestion notification procedure.

These and other objects of the present invention can be achieved by a congestion notifying device installed in individual communication units of an asynchronous transfer mode (ATM network, which comprises: a congestion indication signal generator for generating a congestion indication signal when congestion occurs within any one of the communication units; an explicit forward congestion indication (EFCI) bit set position detector for generating set position information to detect a prescribed bit set position of each incoming cell in response to a cell synchronization signal and a cell clock signal; and an explicit forward congestion indication (EFCI) bit set control unit for responding to the congestion indication signal and the set position information to set on the prescribed bit set position of each incoming cell an explicit forward congestion indication (EFCI) bit for notifying of occurrence of congestion in any one of the communication units.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
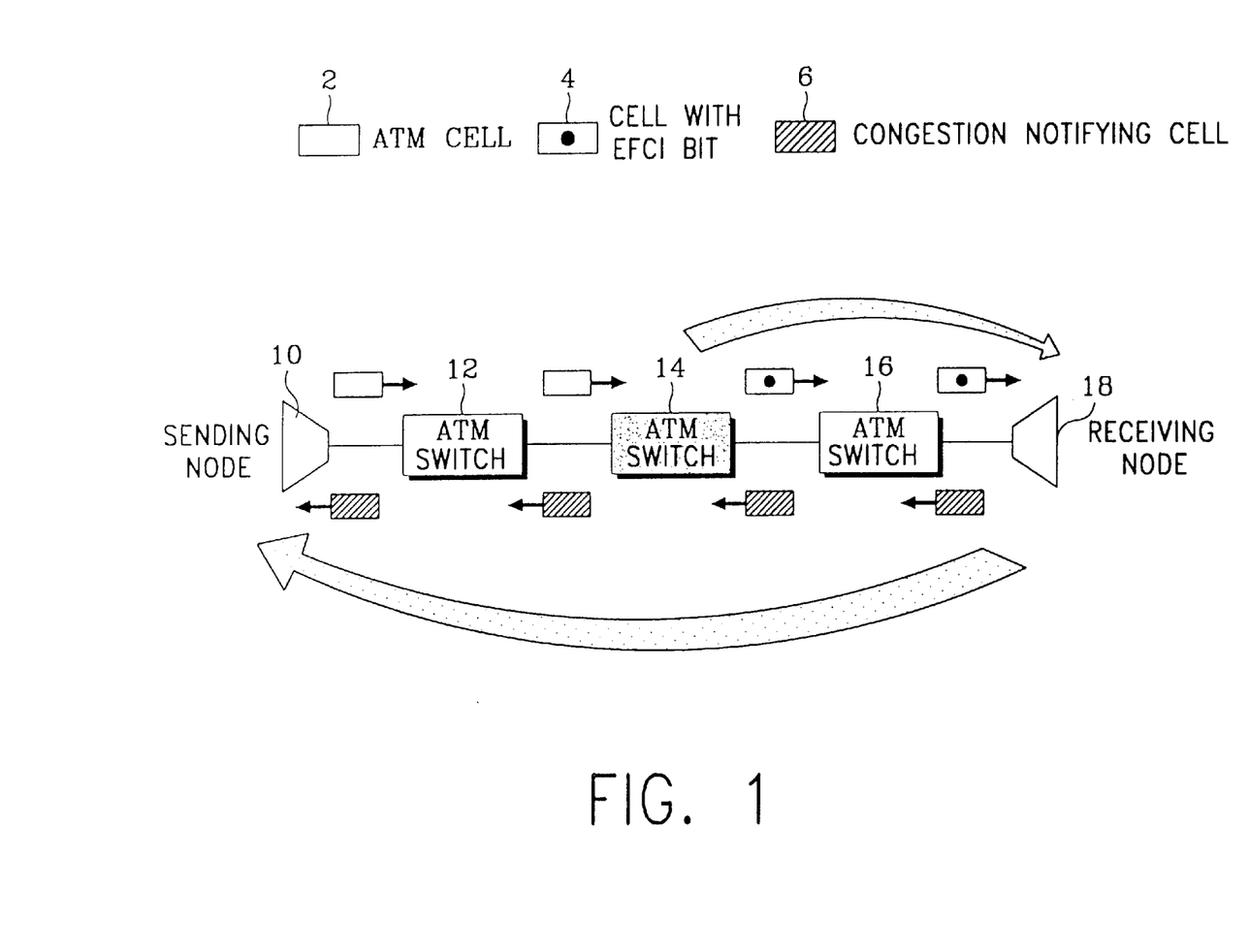
FIG. 1 is a conceptual block diagram illustrating an explicit forward congestion control in an ATM network.

Referring now to the drawings, FIG. 1 illustrates the concept of explicit forward congestion notification (EFCN) usable in communication devices of an ATM network. In particular, FIG. 1 shows an example of the forward congestion notifying function of an ATM network in the case that any part of communication devices connected to the ATM network is congested. As shown in FIG. 1, the reference number 2 refers to an ATM cell, the reference number 4 refers to a cell having an EFCI bit, and the reference number 6 refers to a congestion notifying cell. Communication devices connected to the ATM network are designated as ATM switches 12, 14, 16. For purposes of discussion, the ATM switch 14 is assumed to be congested.

In the congested ATM switch 14, EFCI bits are set to ATM cells which are then output in a forward direction from a sending node 10 to a receiving node 18. ATM cells having EFCI bits inform all the ATM switches 16 of the congestion state, while reaching the final destination, i.e., the receive node 18. The final destination, ie., the receive node 18, returns the congestion notifying cell in a reverse direction so that all of the ATM switches and the sending and receiving nodes can be informed of the congestion state.

Figure 2:
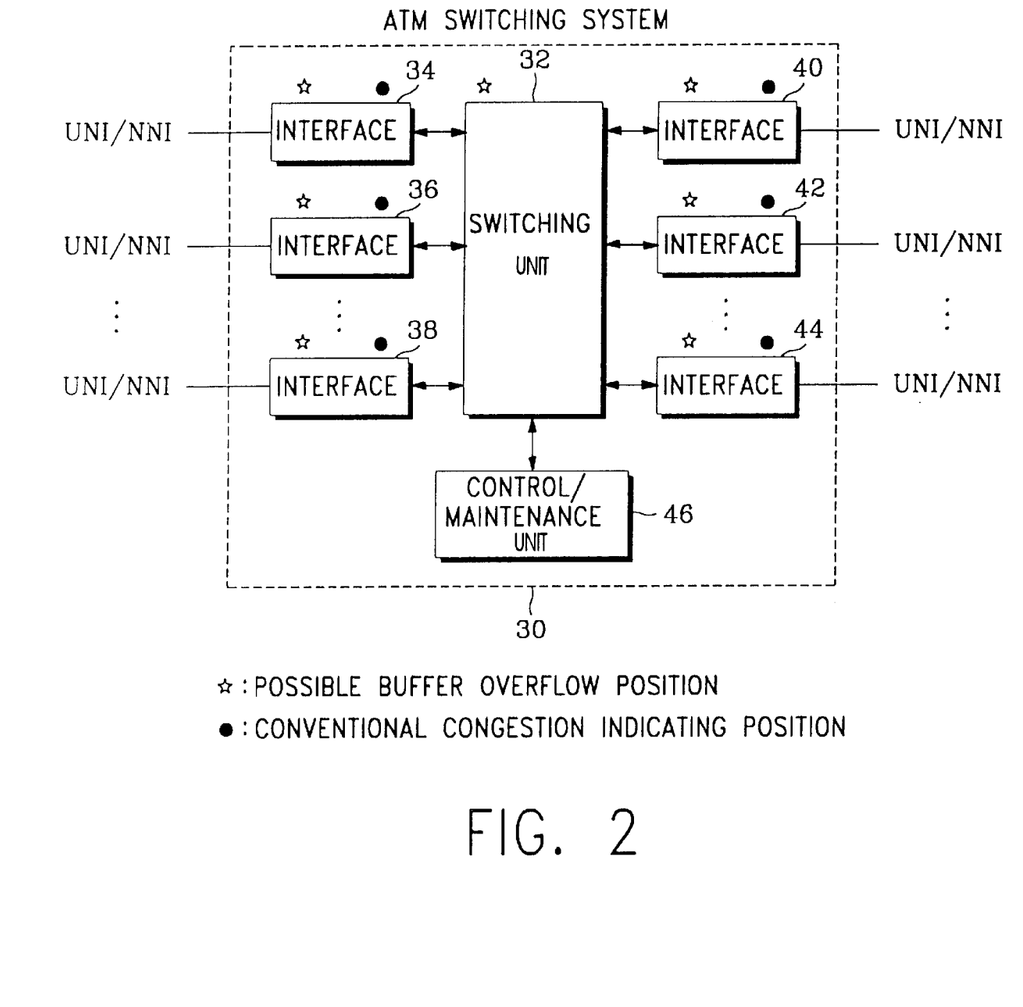
FIG. 2 is a descriptive block diagram illustrating the function of the explicit forward congestion notification of an ATM switching system.

FIG. 2 is a descriptive block diagram illustrating the function of the explicit forward congestion notification of the ATM switching system 30. Possible overflowing positions in the is ATM switching system 30 are devices using internal buffers, which include the switching unit 32 and various interfaces 34–44 connected to the switching unit 32 as marked with star symbols (*) (control/maintenance unit 46 is included when transferring the control/maintenance information to ATM cells.).

Generally, the congestion notifying function is designed to be performed only in interfaces 34–44 which are marked with dot symbols (•) when the congestion, such as buffer overflow, arises in those positions. Therefore, when congestion occurs in the switching unit 32 or in the control/maintenance unit 46, congestion notification must be effected by means of additional hardware and a separate information channel for transferring the congestion notification to the interfaces 34–44, which is a major drawback.

Figure 3:
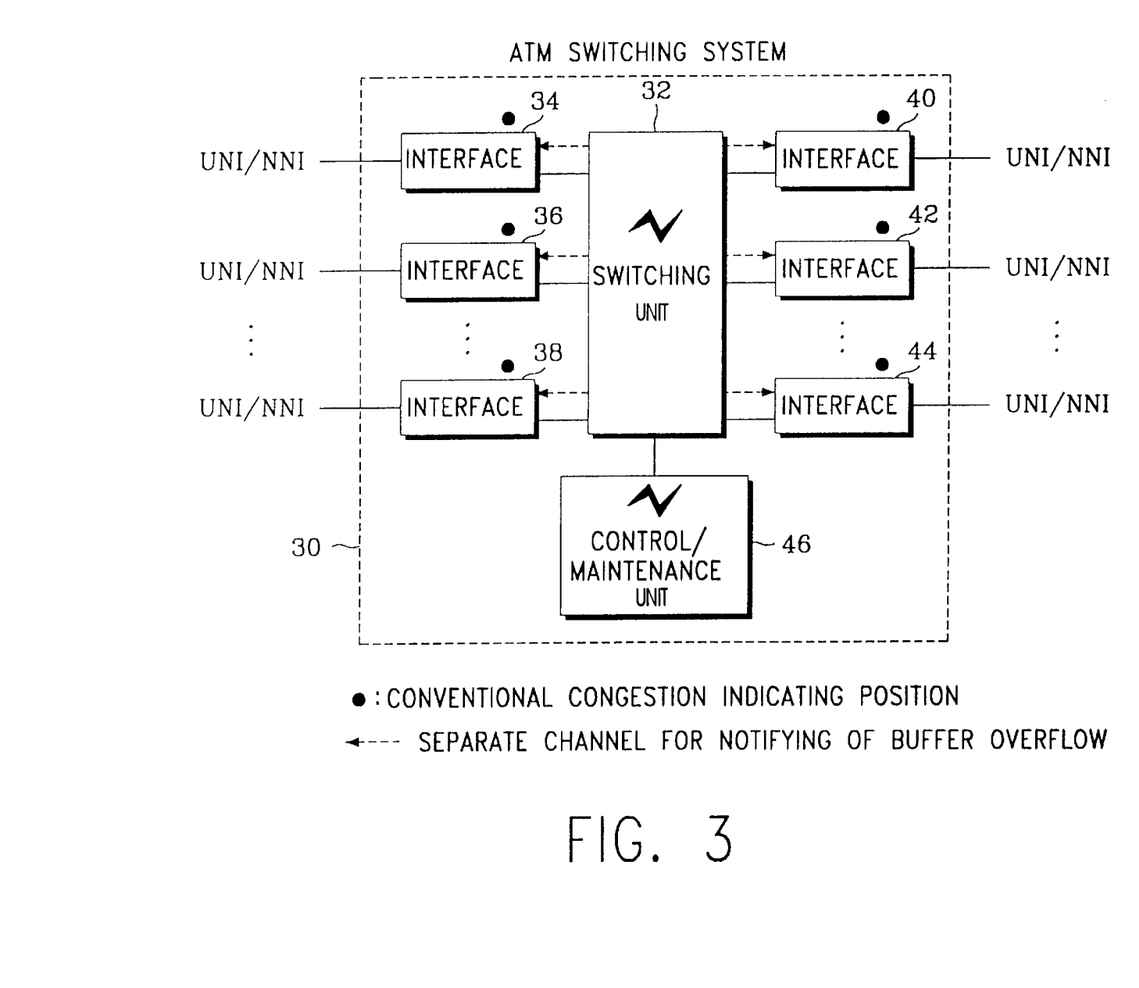
FIG. 3 is of explanatory block diagram illustrating the buffer overflow noting function of an ATM switching system.

FIG. 3 illustrates an embodiment of separate information channels for transferring the congestion notification according to contemporary ATM switching system when buffer overflow occurs in the switching unit 32 or in the control/maintenance unit 46. As shown in FIG. 3, the dotted arrows represent the separate information channels provided for transferring buffer overflow information (in arrow directions) to the interfaces 34–44. That is, the switching unit 32 and the control/maintenance unit 46 must be provided with additional hardware in order to transfer such buffer overflow information through separate information channels.

In addition, the ATM switching system using the explicit forward congestion notification (EFCN) method has another drawback in that, although separate information channels and additional hardware are provided, the processing time is delayed by the information collection time, and as a result, the congestion control speed is decreased. Moreover, the interfaces 34–44 must administer and control the congestion states for every established connection when each connection is provided with a congestion mark. That is, the interfaces 34–44 must check whether the current congestion state affects all the connections or any specific connection(s), and if any, find out the specific connection(s) so as to be able to control the congestion. Since the number of connections available in the ATM network are $2^{24}$ at the maximum in the case of a user network interface (UNI), however, congestion control and administration at every connection is practically impossible.

Figure 4:
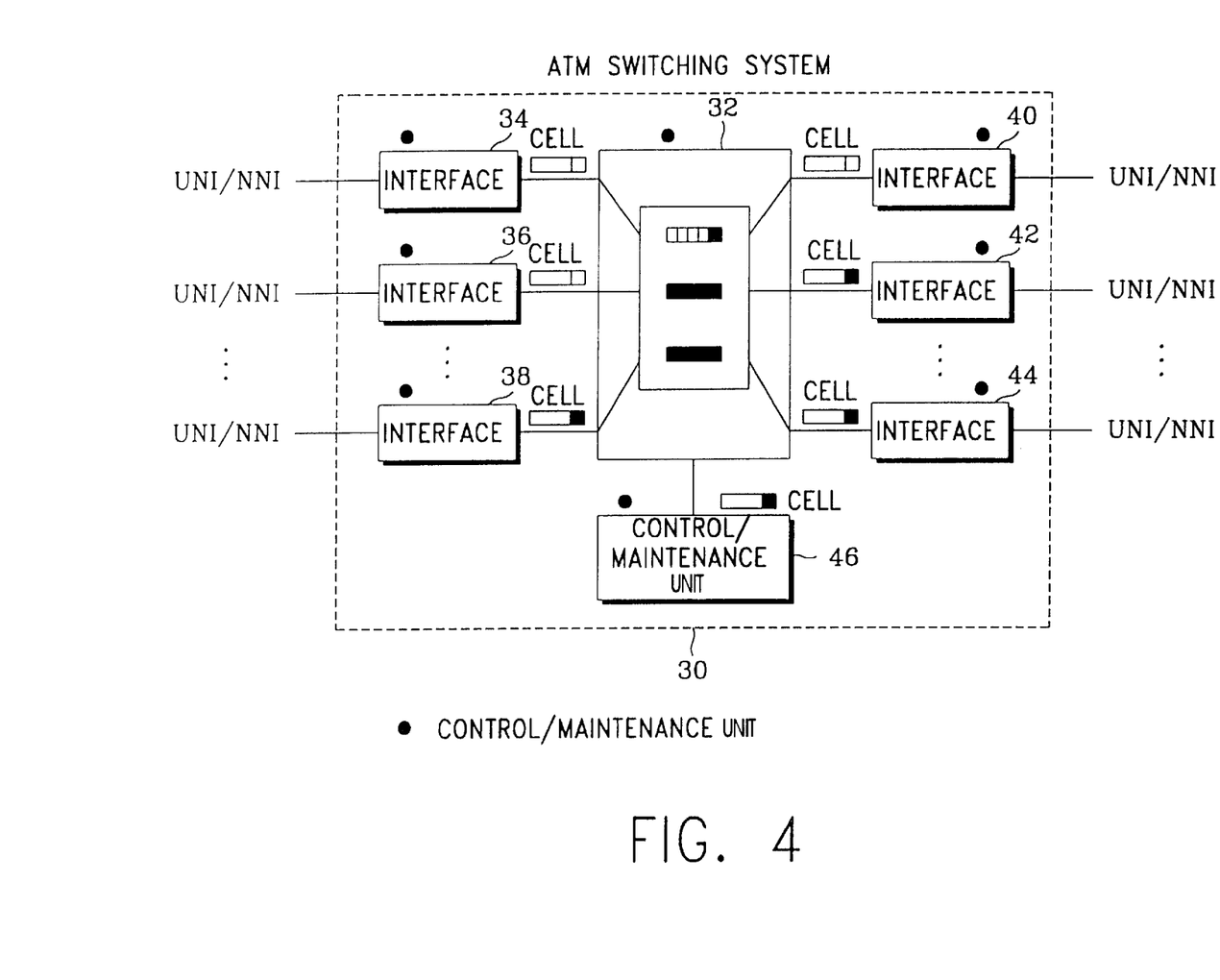
FIG. 4 is a descriptive block diagram illustrating a distributed structure of the congestion notifying function of an ATM switching system according to an embodiment of the present invention.

Turning now to FIG. 4, that figure illustrates a distributed structure of the congestion notifying function of an ATM switching system according to an embodiment of the present invention. All possible congestion (i.e., buffer overflow) positions are provided with congestion notifying functions.

Since congestions such as overflow may occur in the ATM network wherever the buffer exists, the congestion notifying functions are distributed according to the present invention, and are provided not only in interfaces 34–44 but also in switching unit 32 as well as control/maintenance unit 46. Positions marked with dot symbol (•) in FIG. 4 can perform the congestion notifying functions.

Figure 6:
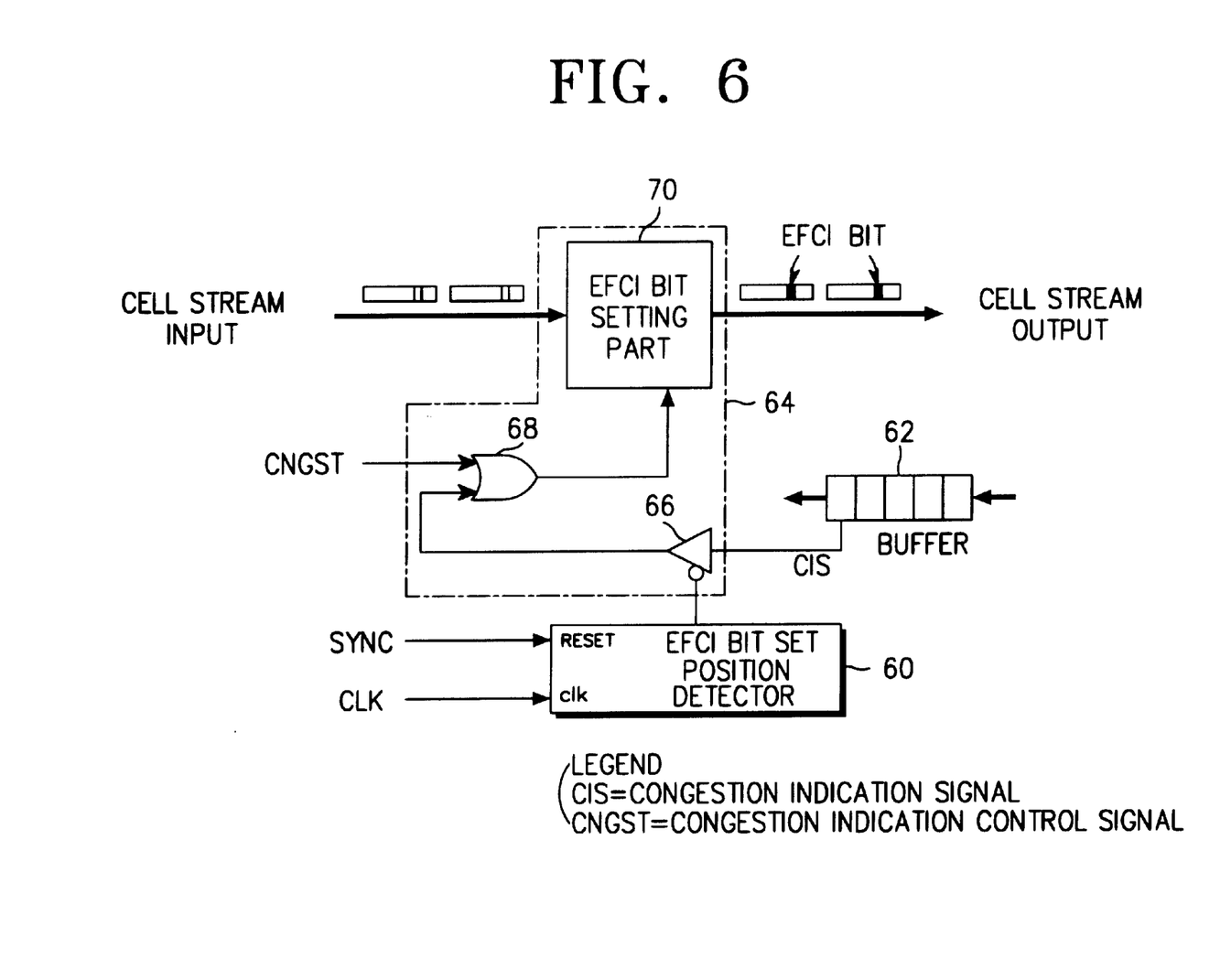
FIG. 6 is a descriptive block diagram illustrating a congestion notifying device constructed according to the principles of the present invention.

All the positions performing the congestion notifying functions, i.e., the interfaces 34–44, the switching unit 32, and the control/maintenance unit 46, are provided with respective congestion notifying devices constructed according to the present invention as shown in FIG. 6, which are used to set the congestion notification bit, i.e., EFCI bit, to the ATM cells received when buffer overflow occurs in the internal buffer.

Figure 5:
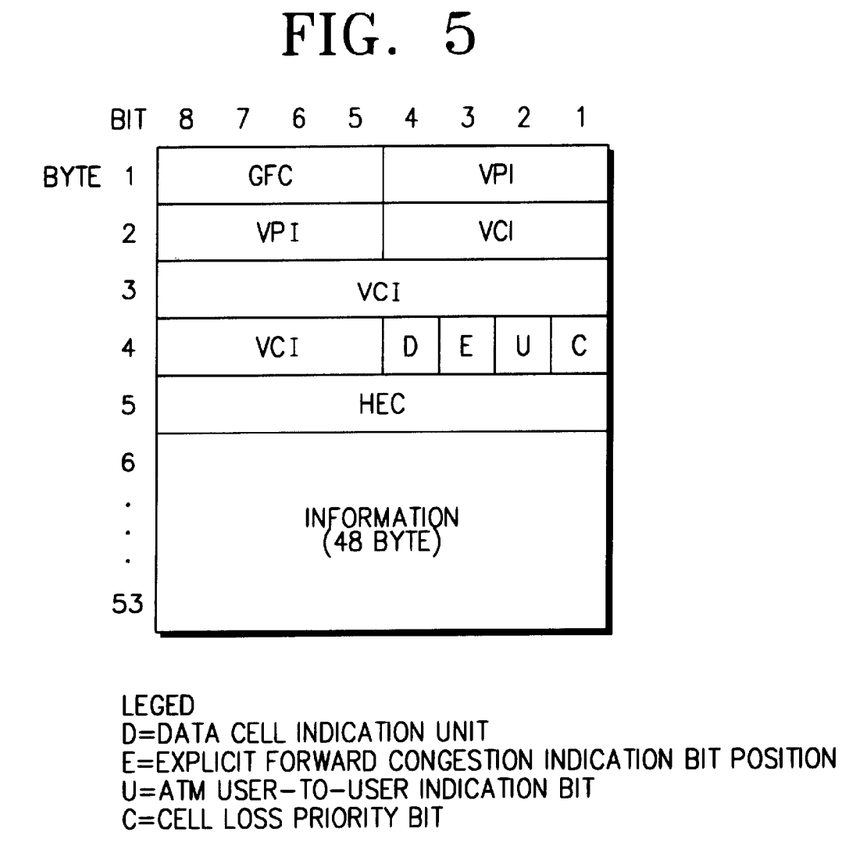
FIG. 5 is an ATM format chart illustrating EFCI bit positions of an ATM cell header according to an embodiment of the present invention.

FIG. 5 illustrates an ATM cell structure usable for ATM switching system according to the principles of the present invention. The EFCI bit position of an ATM cell header according to the present invention is a sixth bit of fourth byte of an ATM cell header, as represented by "E" as shown in FIG. 5. Each ATM cell has a total of fifty-three (53) bytes, and includes a header area of five (5) bytes and a user information area of forty eight (48) bytes. The header area is comprised of a generic flow as control field (GFC) which occupies the upper four bits of the first byte, a virtual path identifier (VPI) which occupies the lower four bits of the first byte and the upper four bits of the second byte, a virtual channel identifier (VCI) which occupies the lower four bits of the second byte, the third byte, and the upper four bits of the fourth byte for identifying ATM cells belonging to the same virtual channel on an asynchronous time division multiplex. A fifth bit (D) of the fourth byte of the cell header is intended for data cell indication bit. A seventh bit (U) is intended for ATM user-to-user indication bit, and a eighth bit (C) is intended for cell loss priority (CLP).

FIG. 6 illustrates a congestion notifying device constructed according to the principles of the present invention. As shown in FIG. 6, the congestion notifying device consists of an EFCI bit set position detector 60, a buffer 62, and an EFCI bit set control unit 64.

EFCI bit set position detector 60 outputs the set position information for detecting the EFCI bit set position within the cell by using the cell synchronization (SYNC) signal and the cell clock signal (CLK). The buffer 62 produces the congestion indication signal (CIS) when buffer overflow occurs. The EFCI bit set control unit 64 controls the congestion indication signal (CIS) generated by buffer 62 so as to be set on the prescribed EFCI bit set position of the incoming cell by using the set position information produced by the EFCI bit set detector position 60. The EFCI bit set control unit 64 consists of tri-state buffer 66, OR gate 68, and EFCI bit setting part 70.

The operation of the congestion notifying device for each of the interfaces 34–44, switching unit 32 and control/maintenance unit 46 of an ATM switching system will now be described in detail with reference to the ATM cell format of FIG. 5 hereinbelow.

When buffer overflow arises in buffer(s) 62 of the congestion notifying device provided within interfaces 34–44, switching unit 32, and control/maintenance unit 46, the buffer 62 generates and transmits the congestion indication signal to tri-state buffer 66 of EFCI bit set control unit 64. In buffer 62, buffer overflow occurs when the buffer becomes full or reaches a preset threshold value. If the buffer 62 is designed so as to generate the CIS at the time when reaching the threshold value, the congestion can be controlled in advance before the buffer overflow arises (quasi-overflow state), and accordingly, the actual buffer overflow can be prevented.

In addition, the EFCI bit set detector 60 position detects the EFCI bit set position by using a cell synchronization signal SYNC and a cell clock signal CLK To describe in detail, the EFCI position bit set detector 60 is initialized by the synchronization signal SYNC of the ATM cell, and counts up to the count value corresponding to the prescribed EFCI bit set position (sixth position of fourth byte of the ATM cell header as shown in FIG. 5). Upon completion of the counting operation, the EFCI bit set position detector 60 enables the tri-state buffer 66 which in turn transmits the congestion indication signal CIS to the OR gate 68. Then, the OR gate 68 logically processes the congestion indication control signal CNGST received from the control unit (CPU) of the ATM switching system and the congestion indication signal CIS, and applies the result to the EFCI bit setting part 70.

The congestion indication control signal CNGST is used for controlling the congestion by connections. When marking the congestion indication only to a specific connection, the CPU of of the ATM switching system applies the CNGST "1" only to the ATM cell corresponding to the specific connection among all the ATM cells received. Such application of the congestion indication control signal CNGST by the CPU of the ATM switching system enables the congestion control by connections, which advantageously improves the overall efficiency of the congestion control of the present invention.

Based on the congestion indication control signal CNGST received from the CPU of the ATM switching system or the congestion indication signal CIS received from the tri-state buffer 66, the EFCI bit set control unit 64 sets the congestion indication bit "EFCI bit" as "1" to the prescribed congestion indication bit set position of the incoming ATM cell header, i.e., to the sixth bit ("E" in FIG. 5) of the fourth byte.

As described above, the present invention has the following advantages: First, efficient congestion control can be attained by simple signal processing. Second, no of additional hardware is needed for notifying interfaces of buffer overflow, which is highly desirable and advantageous over contemporary congestion control systems. Third, congestion control at all connections in an ATM switching system is now possible. Fourth, construction of the congestion notifying device is simple, and as a result, production cost can be considerably reduced.

While there have been illustrated and described what are considered to be preferred embodiments of the present invention, it will be understood by those skilled in the art that various changes and modifications may be made, and equivalents may be substituted for elements thereof without departing from the true scope of the present invention. For example, the congestion notifying device of the present invention can be applied to an ATM transmission system including ATM network terminating equipment, ATM line concentrator, and ATM multiplexer. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A congestion notifying device installed in individual communication devices of an asynchronous transfer mode network, comprising:
   a congestion indication signal generator for generating a congestion indication signal when congestion occurs within any one of said communication devices;
   an explicit forward congestion indication bit set position detector for generating set position information to detect a prescribed bit set position of each incoming cell in response to a cell synchronization signal and a cell clock signal; and
   an explicit forward congestion indication bit set control unit for responding to said congestion indication signal and said set position information to set, on said prescribed bit set position of each incoming cell, an explicit forward congestion indication bit for notifying of occurrence of said congestion in said any one of said communication devices;
   wherein said explicit forward congestion indication bit set control unit comprises a tri-state buffer for enabling transmission of said congestion indication signal in response to receipt of said set position information.

2. The congestion notifying device of claim 1, said congestion indication signal generator comprising a buffer adapted to generate said congestion indication signal when said buffer becomes full.

3. The congestion notifying device of claim 1, said explicit forward congestion indication bit set position detector beginning counting said cell clock signal upon initialization of said synchronization signal until said prescribed bit set position of each incoming cell is reached for generating said set position information to permit passage of said congestion indication signal generated from said congestion indication signal generator.

4. The congestion notifying device of claim 1, wherein said explicit forward congestion indication bit set control unit further comprises setting means connected to said tri-state buffer for setting, on said prescribed bit set position of each incoming call, said explicit forward congestion indication bit to notify of occurrence of said congestion in said any one of said communication devices.

5. The congestion notifying device of claim 4, wherein said setting means comprises an OR gate connected to an output of said tri-state buffer and a bit setting part having an input connected to an output of said OR gate.

6. A congestion notifying device installed in individual communication devices of an asyncbronous transfer mode network comprising:
   a congestion indication signal generator for generating a congestion indication signal when congestion occurs within any one of said communication devices;
   an explicit forward congestion indication bit set position detector for generating set position information to detect a prescribed bit set position of each incoming cell in response to a cell synchronization signal and a cell clock signal; and
   an explicit forward congestion indication bit set control unit for responding to said congestion indication signal and said set position information to set, on said prescribed bit set position of each incoming cell, an explicit forward congestion indication bit for notifying of occurrence of said congestion in said any one of said communication devices;
   said explicit forward congestion indication bit set control unit comprising:
   a tri-state buffer for enabling transmission of said congestion indication signal in response to receipt of said set position information;
   an OR gate having a first input terminal coupled to receive said congestion indication signal from said tri-state buffer and a second input terminal coupled to receive a congestion control signal, for logically combining said congestion indication signal and said congestion control signal to generate a bit setting signal; and
   a bit setting unit for setting, on said prescribed bit set position of each incoming cell, said explicit forward congestion indication bit in response to receipt of said bit setting signal to notify of occurrence of said congestion in said any one of said communication devices.

7. The congestion notifying device of claim 6, said incoming cell including a header area of at least four bytes, said header area comprising a generic flow control field which occupies upper four bits of a first byte, a virtual path identifier which occupies lower four bits of the first byte and upper four bits of a second byte, a virtual channel identifier which occupies lower four bits of the second byte, all of a third byte, and upper four bits of a fourth byte, a data cell indication bit position which occupies a fifth bit of the fourth byte, a user-to-user indication bit position which occupies a seventh bit of the fourth byte, a cell loss priority bit which occupies an eighth bit of the fourth byte, and said prescribed bit set position which occupies a sixth bit of the fourth be of said header area.

8. The congestion notifying device of claim 7, wherein said incoming cell has fifty-three bytes and includes a user information area of forty-eight bytes.

9. A congestion notifying device installed in individual communication devices of an asynchronous transfer mode network, comprising:
   a congestion indication signal generator for generating a congestion indication signal when congestion occurs within any one of said communication devices;
   an explicit forward congestion indication bit set position detector for generating set position information to detect a prescribed bit set position of each incoming cell in response to a cell synchronization signal and a cell clock signal; and
   an explicit forward congestion indication bit set control unit for responding to said congestion indication signal and said set position information to set, on said prescribed bit set position of each incoming cell, an explicit forward congestion indication bit for notifying of occurrence of said congestion in said any one of said communication devices;
   said incoming cell having fifty-three bytes and including a user information area of forty eight bates and a header area, said header area comprising a generic flow control field which occupies upper four bits of a first byte, a virtual path identifier which occupies lower four bits of the first byte and upper four bits of a second byte, a virtual channel identifier which occupies lower four bits of the second byte, all of a third byte, and upper four bits of a fourth byte, a data cell indication bit position which occupies a fifth bit of the fourth byte, a user-to-user indication bit position which occupies a seventh bit of the fourth byte, a cell loss priority bit which occupies an eighth bit of the fourth byte, and said prescribed bit set position which occupies a sixth bit of the fourth byte of said header area.

10. A congestion notifying device installed in a communication device subject to congestion in an asynchronous transfer mode (ATM) network, comprising:

a buffer including means for generating a congestion indication signal when a buffer overflow occurs within said communication device;

an explicit forward congestion indication (EFCI) bit set position detector for detecting an EFCI bit set position within an incoming cell by using a cell synchronization signal and a cell clock signal;

a gate for passing said congestion indication signal upon detection of said EFCI bit set position within said incoming cell; and a bit setting unit for setting an EFCI bit at the EFCI bit set position within said incoming cell in response to said congestion indication signal passed through said gate;

wherein said congestion indication signal is a signal used for controlling congestion at connections of the ATM network.

11. The congestion notifying device of claim 10, wherein said buffer overflow occurs when said buffer becomes full.

12. The congestion notifying device of claim 10, wherein said buffer overflow is a quasi-overflow which occurs when data stored in said buffer reaches a preset threshold value less than a fill capacity of said buffer.

13. The congestion notifying device of claim 10, wherein said communication device subjected to congestion comprises one of an interface, a switching unit, and a control/maintenance unit of the ATM network.

14. The congestion notifying device of claim 10, further comprising an OR gate provided between said gate and said bit setting unit for logically processing said congestion indication signal passed through said gate and a congestion indication control signal applied from a control unit of the ATM network for enabling setting of said EFCI bit at the EFCI bit set position within said incoming cell.

15. A congestion notifying method for notifying of occurrence of congestion in individual communication devices of an asynchronous transfer mode (ATM) network, said method comprising the steps of:

generating a congestion indication signal when congestion occurs within any one of said communication devices;

generating set position information to detect a prescribed bit set position of each incoming cell in response to a cell synchronization signal and a cell clock signal; and setting at a prescribed bit set position of each incoming cell, an explicit forward congestion indication bit for notifying of occurrence of said congestion in said any one of said communication devices in response to said congestion indication signal and said set position information;

wherein said congestion indication signal is a signal used for controlling congestion at connections of the ATM network.

16. The congestion notifying method of claim 15, said congestion indication signal being generated when an internal buffer of said any one of said communication devices becomes full.

17. The congestion notifying method of claim 15, said set position information being generated after counting said cell clock signal upon initialization by said synchronization signal until said prescribed bit set position of each incoming cell is reached.

18. A congestion notifying method for notifying of occurrence of congestion in individual communication devices of an asynchronous transfer mode network said method comprising the steps of:

generating a congestion indication signal when congestion occurs within any one of said communication devices;

generating set position information to detect a prescribed bit set position of each incoming cell in response to a cell synchronization signal and a cell clock signal; and setting at a prescribed bit set position of each incoming cell, an explicit forward congestion indication bit for notifying of occurrence of said congestion in said any one of said communication devices in response to said congestion indication signal and said set position information;

said explicit forward congestion indication bit being set at said prescribed bit set position of each incoming cell by a control unit comprising:

a tri-state buffer for enabling transmission of said congestion indication signal in response to receipt of said set position information;

an OR gate having a first input terminal coupled to receive said congestion indication signal from said tri-state buffer and a second input terminal coupled to receive a congestion control signal, for logically combining said congestion indication signal and said congestion control signal to generate a bit setting signal; and a bit setting unit for setting, on said prescribed bit set position of each incoming cell, said explicit forward congestion indication bit in response to receipt of said bit setting signal to notify of occurrence of said congestion in said any one of said communication devices.

19. The congestion notifying device of claim 18, said incoming cell including a header area of at least four bytes, said header area comprising a generic flow control field which occupies upper four bits of a first byte, a virtual path identifier which occupies lower four bits of the first byte and upper four bits of a second byte, a virtual channel identifier which occupies lower four bits of the second byte, all of a third byte, and upper four bits of a fourth byte, a data cell indication bit position which occupies a fifth bit of the fourth byte, a user-to-user indication bit position which occupies a seventh bit of the fourth byte, a cell loss priority bit which occupies an eighth bit of the fourth byte, and said prescribed bit set position which occupies a sixth bit of the fourth be of said header area.

20. The congestion notifying device of claim 19, wherein said incoming cell has fifty-three bytes and includes a user information area of forty-eight bytes.

21. A congestion notifying device for notifying of occurrence of congestion in individual communication devices of an asynchronous transfer mode network, said device comprising:

first means for generating a congestion indication signal when congestion occurs within any one of said communication devices;

second means for generating set position information to detect a prescribed bit set position of each incoming cell in response to a cell synchronization signal and a cell clock signal; and third means for setting, at a prescribed bit set position of each incoming cell, an explicit forward congestion indication bit for notifying of occurrence of said congestion in said any one of said communication devices in response to said congestion indication signal and said set position information;

said incoming cell including a header area of at least four bytes, said header area comprising a generic flow control field which occupies upper four bits of a first byte, a virtual path identifier which occupies lower four bits of the first byte and upper four bits of a second byte, a virtual channel identifier which occupies lower four bits of the second byte, all of a third byte and upper four bits of a fourth byte, a data cell indication bit position which occupies a fifth bit of the fourth byte, a user-to-user indication bit position which occupies a seventh bit of the fourth byte, a cell loss priority bit which occupies an eighth bit of the fourth byte, and said prescribed bit set position which occupies a sixth bit of the fourth byte of said header area.

22. The congestion notifying device of claim 21, wherein said incoming cell has fifty-three bytes and includes a user information area of forty-eight bytes.

23. A congestion notifying device installed in a communication device subject to congestion in an asynchronous transfer mode (ATM) network, comprising:

means for generating a congestion indication signal;

means for receiving a congestion indication control signal from a control unit of the ATM network;

OR gate means connected directly to said generating means and directly to said receiving means for logically processing said congestion indication signal and said congestion indication control signal so as to pass one of said congestion indication signal and said congestion indication control signal as an output of said OR gate means; and bit setting means connected to said output of said OR gate means for setting an explicit forward congestion indication (EFCI) bit within an incoming cell in response to said output of said OR gate means.

24. The congestion notifying device of claim 23, further comprising EFCI bit set position detector means for detecting an EFCI bit set position within the incoming cell by using a cell synchronization signal and a cell clock signal received as an input thereto.

25. The congestion notifying device of claim 24, further comprising an additional gate connected to said EFCI bit set position detector means for passing said congestion indication signal upon detection of said EFCI bit set position within said incoming cell.

26. The congestion notifying device of claim 23, wherein said generating means comprises a buffer for generating the congestion indication signal when a buffer overflow occurs within said communication device.

27. The congestion notifying device of claim 26, wherein said buffer overflow occurs when said buffer becomes full.

28. The congestion notifying device of claim 26, wherein said buffer overflow is a quasi-overflow which occurs when data stored in said buffer reaches a preset threshold value less than a full capacity of said buffer.

29. The congestion notifying device of claim 23, wherein said communication device subjected to congestion comprises one of an interface, a switching unit, and a control/maintenance unit of the ATM network.

30. The congestion notifying device of claim 23, wherein said congestion indication control signal is a signal used for controlling congestion at connections of the ATM network.

* * * * *